United States Patent
Tomiyama

(10) Patent No.: US 9,784,352 B2
(45) Date of Patent: Oct. 10, 2017

(54) LOCK-UP DEVICE FOR TORQUE CONVERTER

(71) Applicant: EXEDY Corporation, Neyagawa-shi, Osaka (JP)

(72) Inventor: Naoki Tomiyama, Neyagawa (JP)

(73) Assignee: EXEDY CORPORATION, Osaka (JP)

( * ) Notice: Subject to any disclaimer, the term of this patent is extended or adjusted under 35 U.S.C. 154(b) by 0 days.

(21) Appl. No.: 14/894,344

(22) PCT Filed: May 16, 2014

(86) PCT No.: PCT/JP2014/063076
§ 371 (c)(1),
(2) Date: Nov. 26, 2015

(87) PCT Pub. No.: WO2014/196339
PCT Pub. Date: Dec. 11, 2014

(65) Prior Publication Data
US 2016/0116043 A1 Apr. 28, 2016

(30) Foreign Application Priority Data

Jun. 4, 2013 (JP) ................................. 2013-117889
Jul. 25, 2013 (JP) ................................. 2013-154506

(51) Int. Cl.
*F16H 45/02* (2006.01)
*F16F 15/123* (2006.01)
*F16F 15/14* (2006.01)

(52) U.S. Cl.
CPC ....... *F16H 45/02* (2013.01); *F16F 15/12353* (2013.01); *F16F 15/1421* (2013.01);
(Continued)

(58) Field of Classification Search
CPC ............. F16H 45/02; F16H 2045/0205; F16H 2405/0221; F16H 2405/0226;
(Continued)

(56) References Cited

U.S. PATENT DOCUMENTS

| 5,020,647 A | 6/1991 | Fujimoto et al. |
| 2010/0096788 A1 | 4/2010 | Farahati et al. |

(Continued)

FOREIGN PATENT DOCUMENTS

| CN | 1576627 A | 2/2005 |
| CN | 101487524 A | 7/2009 |

(Continued)

OTHER PUBLICATIONS

Office Action dated Oct. 3, 2016 for U.S. Appl. No. 14/903,597, filed Jan. 8, 2016, 8 pp.

(Continued)

*Primary Examiner* — Richard Lorence
(74) *Attorney, Agent, or Firm* — United IP Counselors, LLC

(57) ABSTRACT

A lock-up device for a torque converter is disposed between a front cover coupled to an engine-side member and a torque converter body and directly transmits a torque from the front cover to a turbine of the torque converter. The lock-up device includes a clutch portion to transmit the torque from the front cover to an output side. The lock-up device includes an intermediate member in a power transmission path between the clutch portion and the turbine. An input-side damper mechanism mounted between the clutch portion and the intermediate member attenuates variation in rotational speed. An output-side damper mechanism mounted between the intermediate member and the turbine generates a hysteresis torque larger than a hysteresis torque of the input-side damper mechanism and attenuates variation in (Continued)

rotational speed. The lock-up device also includes a dynamic damper device coupled to the intermediate member and that attenuates variation in rotational speed.

7 Claims, 5 Drawing Sheets

(52) U.S. Cl.
CPC ........... F16H 2045/0205 (2013.01); F16H 2045/0226 (2013.01); F16H 2045/0263 (2013.01); F16H 2045/0278 (2013.01); F16H 2045/0294 (2013.01)

(58) Field of Classification Search
CPC ..... F16H 2405/0231; F16H 2405/0263; F16H 2405/0278; F16F 15/12353; F16F 15/1421
See application file for complete search history.

(56) References Cited

U.S. PATENT DOCUMENTS

| | | | |
|---|---|---|---|
| 2010/0242466 A1* | 9/2010 | Krause | F16F 15/145 60/327 |
| 2010/0269497 A1* | 10/2010 | Engelmann | F16F 15/145 60/338 |
| 2011/0031083 A1* | 2/2011 | Matsuoka | F16H 45/02 192/3.29 |
| 2011/0099992 A1* | 5/2011 | Magerkurth | F16F 15/145 60/435 |
| 2011/0287844 A1 | 11/2011 | Steinberger | |
| 2012/0080281 A1 | 4/2012 | Takikawa et al. | |
| 2012/0208648 A1* | 8/2012 | Takikawa | F16H 45/02 464/68.8 |
| 2012/0217113 A1 | 8/2012 | Kawahara et al. | |
| 2013/0205944 A1 | 8/2013 | Sudau et al. | |
| 2013/0206529 A1 | 8/2013 | Tomiyama | |
| 2013/0225302 A1 | 8/2013 | Kawahara et al. | |

FOREIGN PATENT DOCUMENTS

| | | |
|---|---|---|
| CN | 102597567 A | 7/2012 |
| CN | 103189670 A | 7/2013 |
| CN | 102893055 B | 11/2014 |
| DE | 102011101156 A1 | 11/2011 |
| DE | 112009005514 A | 10/2013 |
| JP | 62-185924 | 11/1987 |
| JP | H227238 Y2 | 7/1990 |
| JP | H05288239 A | 11/1993 |
| JP | H10169756 A | 6/1998 |
| JP | H11303940 A | 11/1999 |
| JP | 2001082577 A | 3/2001 |
| JP | 2001330105 A | 11/2001 |
| JP | 2002213567 A | 7/2002 |
| JP | 2005106112 A | 4/2005 |
| JP | 2008038951 A | 2/2008 |
| JP | 2009041662 A | 2/2009 |
| JP | 2009115112 A | 5/2009 |
| JP | 2009293671 A | 12/2009 |
| JP | 2011099488 A | 5/2011 |
| JP | 2011122621 A | 6/2011 |
| JP | 2011127686 A | 6/2011 |
| JP | 2011185382 A | 9/2011 |
| JP | 4892630 B1 | 3/2012 |
| JP | 2012057694 A | 3/2012 |
| JP | 2012506006 A | 3/2012 |
| JP | 2012077826 A | 4/2012 |
| JP | 2012087856 A | 5/2012 |
| JP | 2012102817 A | 5/2012 |
| JP | 2012122584 A | 6/2012 |
| JP | 2012167755 A | 9/2012 |
| JP | 2012219999 A | 11/2012 |
| JP | 2012251649 A | 12/2012 |
| JP | 2013145025 A | 7/2013 |
| WO | 2010043301 A1 | 4/2010 |
| WO | WO2011055622 A1 | 5/2011 |
| WO | WO2011138216 A1 | 11/2011 |
| WO | 2012053280 A1 | 4/2012 |
| WO | WO2012063586 A1 | 5/2012 |
| WO | WO2012169243 A1 | 12/2012 |
| WO | WO2013161493 A1 | 10/2013 |

OTHER PUBLICATIONS

International Search Report for Int'l App. No. PCT/JP2014/063076, dated Aug. 19, 2014, 1-2.

International Search Report for Int'l App. No. PCT/JP2014/063082, dated Jul. 22, 2014, 1-2.

International Search Report for Int'l App. No. PCT/JP2014/068292, dated Oct. 7, 2014, 1-2.

Notification of Reasons for Refusal dated Apr. 21, 2017 for Japanese Application No. 2013-145453, 8 pp.

* cited by examiner

LOCK-UP DEVICE FOR TORQUE CONVERTER

CROSS-REFERENCES TO RELATED APPLICATIONS

This application is the U.S. National Phase of PCT International Application No. PCT/JP2014/063076, filed on May 16, 2014. That application claims priority to Japanese Patent Application No. 2013-117889, filed Jun. 4, 2013, and Japanese Patent Application No. 2013-154506, filed Jul. 25, 2013. The contents of all three applications are herein incorporated by reference in their entirety.

BACKGROUND

Technical Field

The present invention relates to a lockup device, particularly to a lock-up device for a torque converter, which is disposed between a front cover coupled to an engine-side member and a torque converter body in order to directly transmit a torque from the front cover to a turbine of the torque converter body.

Background Art

A torque converter is embedded with a lock-up device in order to reduce fuel consumption. The lock-up device is disposed between a front cover and a turbine, and is configured to mechanically couple the front cover and the turbine in order to directly transmit a torque therebetween.

In general, the lock-up device includes a piston and a damper mechanism. The piston is pressed onto the front cover by the action of hydraulic pressure, and a torque is transmitted to the piston from the front cover. On the other hand, the damper mechanism includes a plurality of torsion springs, and the piston is elastically coupled to an output-side member coupled to the turbine by the plural torsion springs. In the lock-up device as described above, the torque transmitted to the piston is transmitted to the output-side member through the plural torsion springs, and is further transmitted to the turbine.

Incidentally, Japan Laid-open Patent Application Publication No. 2009-293671 describes a lock-up device that an inertia member is mounted to the output-side member in order to inhibit variation in engine rotation. In the lock-up device described in Japan Laid-open Patent Application Publication No. 2009-293671, the inertia member is mounted to the output member fixed to the turbine so as to be rotatable relatively thereto. Furthermore, torsion springs are mounted as elastic members between the output member and the inertia member.

In the lock-up device of Japan Laid-open Patent Application Publication No. 2009-293671, the inertia member is coupled to the output member through the torsion springs. Therefore, the inertia member and the torsion springs function as a dynamic damper, and these components attenuate variation in rotational speed of the output-side member (turbine).

On the other hand, Japan Laid-open Patent Application Publication No. 2012-87856 describes a lock-up device to be implemented by installing a mechanism for generating a variable, hysteresis torque in a position between the inertia member and the output member within the lock-up device as described in Japan Laid-open Patent Application Publication No. 2009-293671. Even when a lock-up rotational speed is set to be low, the lock-up device can inhibit variation in output-side rotational speed over wide rotational speed ranges.

SUMMARY

In the device of Japan Laid-open Patent Application Publication No. 2012-87856, the hysteresis torque generating mechanism is configured to generate a relatively low first hysteresis torque in a low rotational speed range, and generate a second hysteresis torque larger than the first hysteresis torque in middle to high rotational speed ranges. Accordingly, variation in output-side rotational speed can be inhibited over wide rotational speed ranges.

However, aside from the inertia member composing a part of the dynamic damper device, a slider and a pair of plates for supporting the slider are required in the device of Japan Laid-open Patent Application Publication No 2012-87856. Hence, the number of components of the device is increased. Additionally, an axial space is required for installation of the hysteresis torque generating mechanism.

It is an object of the present invention to effectively attenuate variation in rotational speed over wide rotational speed ranges with a compact construction without increasing the number of components.

Solution to Problems

A lock-up device for a torque converter according to an aspect of the present invention is a device that is disposed between a front cover coupled to an engine-side member and a torque converter body and is configured to directly transmit a torque from the front cover to a turbine of the torque converter. The present lock-up device includes a clutch portion, an intermediate an input-side damper mechanism, an output-side damper mechanism and a dynamic damper device. The clutch portion is configured to transmit the torque from the front cover to an output side. The intermediate member is disposed in a power transmission path between the clutch portion and the turbine. The input-side damper mechanism is mounted between the clutch portion and the intermediate member, and is configured to attenuate variation in rotational speed. The output-side damper mechanism is mounted between the intermediate member and the turbine, and is configured to generate a hysteresis torque larger than a hysteresis torque of the input-side damper mechanism and attenuate variation in rotational speed. The dynamic damper device is coupled to the intermediate member, and is configured to attenuate variation in rotational speed.

In the present device, when the clutch portion is in a clutch-on state (a power transmitted state), a power from the front cover is inputted into the clutch portion, and is transmitted to the turbine through the input-side damper mechanism, the intermediate member and the output-side damper mechanism. At this time, the dynamic damper mechanism is coupled to the intermediate member, and variation in rotational speed can be inhibited by the dynamic damper device.

Here, the output-side damper mechanism, configured to generate hysteresis torque larger than that in the input-side damper mechanism, is mounted between the turbine and the intermediate member to which the dynamic damper device is coupled. Therefore, similarly to when the magnitude of the hysteresis torque in the dynamic damper device is increased, it is possible to enhance an effect of attenuating variation in rotational speed. Moreover, unlike a well-known device, it is not required to additionally provide a hysteresis torque generating mechanism. Hence, the entire device can be compactly formed with a small number of components.

In a lock-up device for a torque converter according to another aspect of the present invention, the input-side damper mechanism is disposed on an inner peripheral side of the output-side damper mechanism.

With the positional arrangement as described above, the magnitude of the hysteresis torque in the output-side damper mechanism can be easily greater than that of the hysteresis torque in the input-side damper mechanism.

In a lock-up device for a torque converter according to yet another aspect of the present invention, the clutch portion includes a piston, a friction member and a drive plate. The piston is axially movable with respect to the front cover. The friction member is mounted to an outer peripheral part of the piston, and is configured to be press-contacted to the front cover. The drive plate is fixed to the piston. Additionally, the intermediate member includes a pair of plates that is rotatably mounted relative to the drive plate and axially interposes therein the drive plate. Moreover, the input-side damper mechanism includes the drive plate, the pair of plates, and a plurality of input-side elastic members elastically and rotation-directionally coupling the drive plate and the pair of plates.

With the construction of the input-side damper mechanism as described above, the magnitude of the hysteresis torque in the input-side damper mechanism can be reduced.

In a lock-up device for a torque converter according to yet another aspect of the present invention, the output-side damper mechanism includes an outer peripheral part of the intermediate member, a driven plate, a plurality of output-side elastic members and a support member. The driven plate is coupled to the turbine. The plural output-side elastic members elastically and rotation-directionally couple the intermediate member and the driven plate. The support member restricts the plural output-side elastic members from radially moving and from axially moving to one side.

With the construction of the output-side damper mechanism as described above, it becomes easy for the output-side damper mechanism to generate a hysteresis torque larger than that in the input-side damper mechanism.

In a lock-up device for a torque converter according to yet another aspect of the present invention, the support member is formed by the outer peripheral part of the intermediate member.

In this case, the output-side damper mechanism is formed with a simple construction.

In a lock-up device for a torque converter according to yet another aspect of the present invention, the dynamic damper device includes an inertia member, a damper plate and a plurality of dynamic damper elastic members. The inertia member is disposed on an outer peripheral side of the output-side elastic members. The damper plate is coupled to the intermediate member. The plural dynamic damper elastic members elastically and rotation-directionally couple the inertia member and the damper plate.

Here, the inertia member composing the dynamic damper device is disposed on the outer peripheral side of the output-side elastic members. With the construction, the inertia member can be disposed such that the axial position thereof overlaps with that of the output-side elastic members. Therefore, the axial space of the entire lock-up device including the dynamic damper device can be reduced. Additionally, the inertia member can be disposed as much on the outer peripheral side as possible in the radial direction. Hence, an inertia moment by the both inertia rings 46 and 47 can be increased, and variation in rotational speed can be more effectively inhibited.

In a lock-up device for a torque converter according to yet another aspect of the present invention, the inertia member includes a first inertia ring and a second inertia ring, which are axially split and have pairs of accommodation recesses axially opposed to each other. Additionally, the plural dynamic damper elastic members are accommodated in the pairs of accommodation recesses of the first and second inertia rings.

Here, the dynamic damper elastic members are accommodated and disposed in the pairs of accommodation recesses of the two inertia rings. Hence, the space occupied by the dynamic damper device can be reduced in comparison with a well-known dynamic damper device. Additionally, it is possible to make de elastic members exert a function of inertia. Hence, the weight of the entire torque converter can be reduced, and variation in rotational speed can be effectively inhibited.

Moreover, the inertia member is herein axially split, and the elastic members are disposed in the pairs of accommodation recesses formed in the respective inertia rings. Therefore, the elastic members can be easily assembled thereto.

According to the present invention as described above, the lock-up device for a torque converter can effectively attenuate variation in rotational speed over wide rotational speed ranges with a compact construction without increasing the number of components.

DETAILED DESCRIPTION OF EMBODIMENTS

Figure 1:
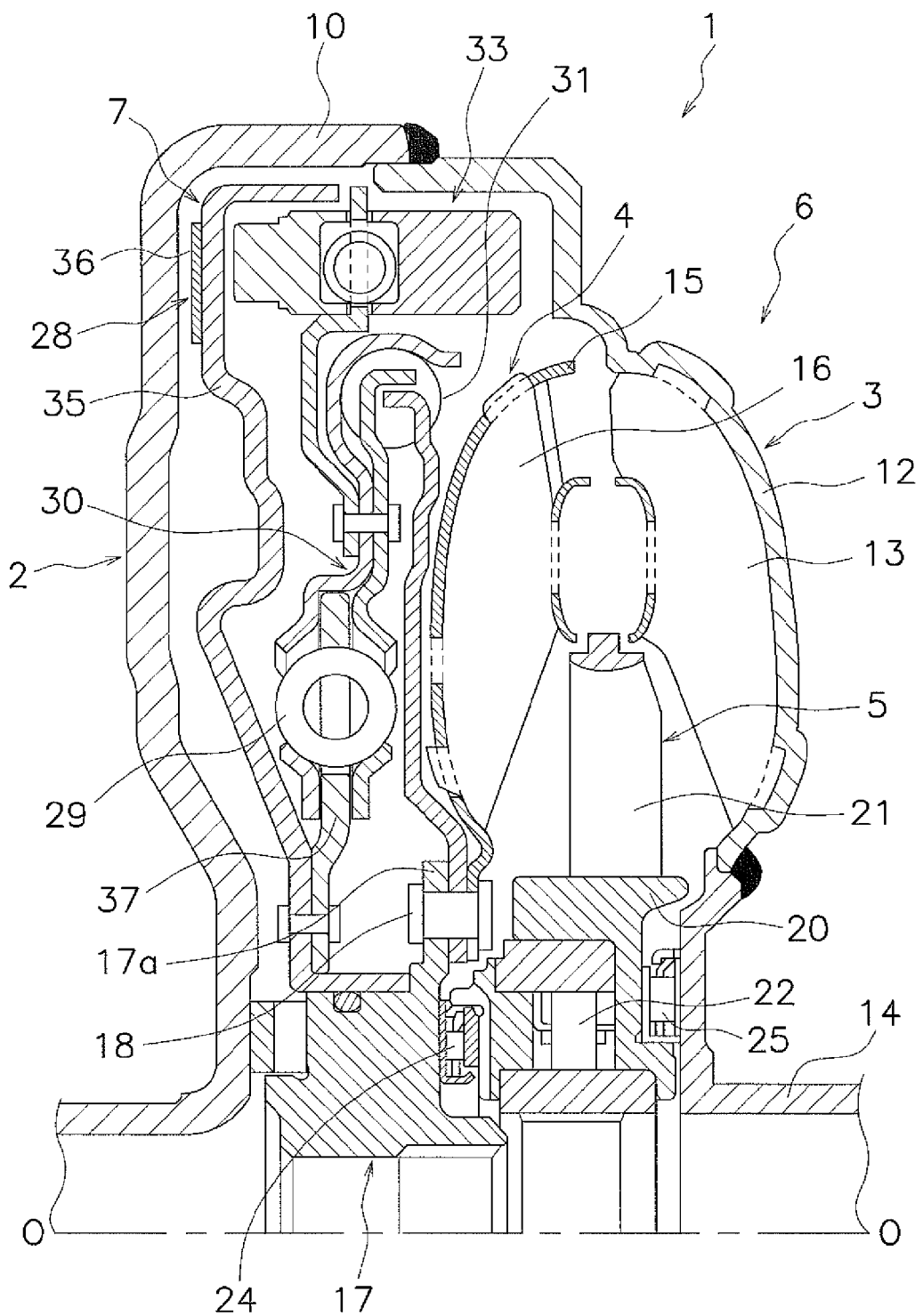
FIG. 1 is a cross-sectional view of a construction of a torque converter equipped with a lock-up device according to a first exemplary embodiment of the present invention.

FIG. 1 is a partial cross-sectional view of a torque converter 1 equipped with a lock-up device according to a first exemplary embodiment of the present invention. In FIG. 1, an engine (not shown in the drawing) is disposed on the left side, whereas a transmission (not shown in the drawing) is disposed on the right side. It should be noted that a line O-O depicted in FIG. 1 indicates a rotational axis of the torque converter and the lock-up device.

[Entire Construction of Torque Converter]

The torque converter 1 is a device for transmitting a torque from an engine-side crankshaft (not shown in the drawings) to an input, shaft of the transmission, and includes a front cover 2 fixed to an input-side member, a torque converter body 6 composed of three types of vane wheels (an impeller 3, a turbine 4 and a stator 5) and a lock-up device 7.

The front cover 2 is a disc-shaped member, and an outer peripheral, tubular part 10 is formed on the outer peripheral part of the front cover 2 so as to protrude toward the transmission. The impeller 3 is composed of an impeller shell 12 fixed to the outer peripheral tubular part 10 of the front cover 2 by welding, a plurality of impeller blades 13 fixed to the inside of the impeller shell 12, and a tubular impeller hub 14 disposed on the inner peripheral side of the impeller shell 12.

The turbine 4 is disposed within a fluid chamber so as to be opposed to the impeller 3. The turbine 4 is composed of a turbine shell 15, a plurality of turbine blades 16 fixed to the turbine shell 15, and a turbine hub 17 fixed to the inner peripheral part of the turbine shell 15. The turbine hub 17 has a flange 17a extending to the outer peripheral side, and the inner peripheral part of the turbine shell 15 is fixed to the flange 17a by a plurality of rivets 18. Furthermore, the input shaft of the transmission (not shown in the drawings) is spline-coupled to the inner peripheral part of the turbine hub 17.

The stator 5 is a mechanism for regulating the flow of operating oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft (not shown in the drawings) through a one-way clutch 22. It should be noted that thrust bearings 24 and 25 are mounted on the both sides of the stator carrier 20 in the axial direction.

[Lock-Up Device 7]

Figure 2:
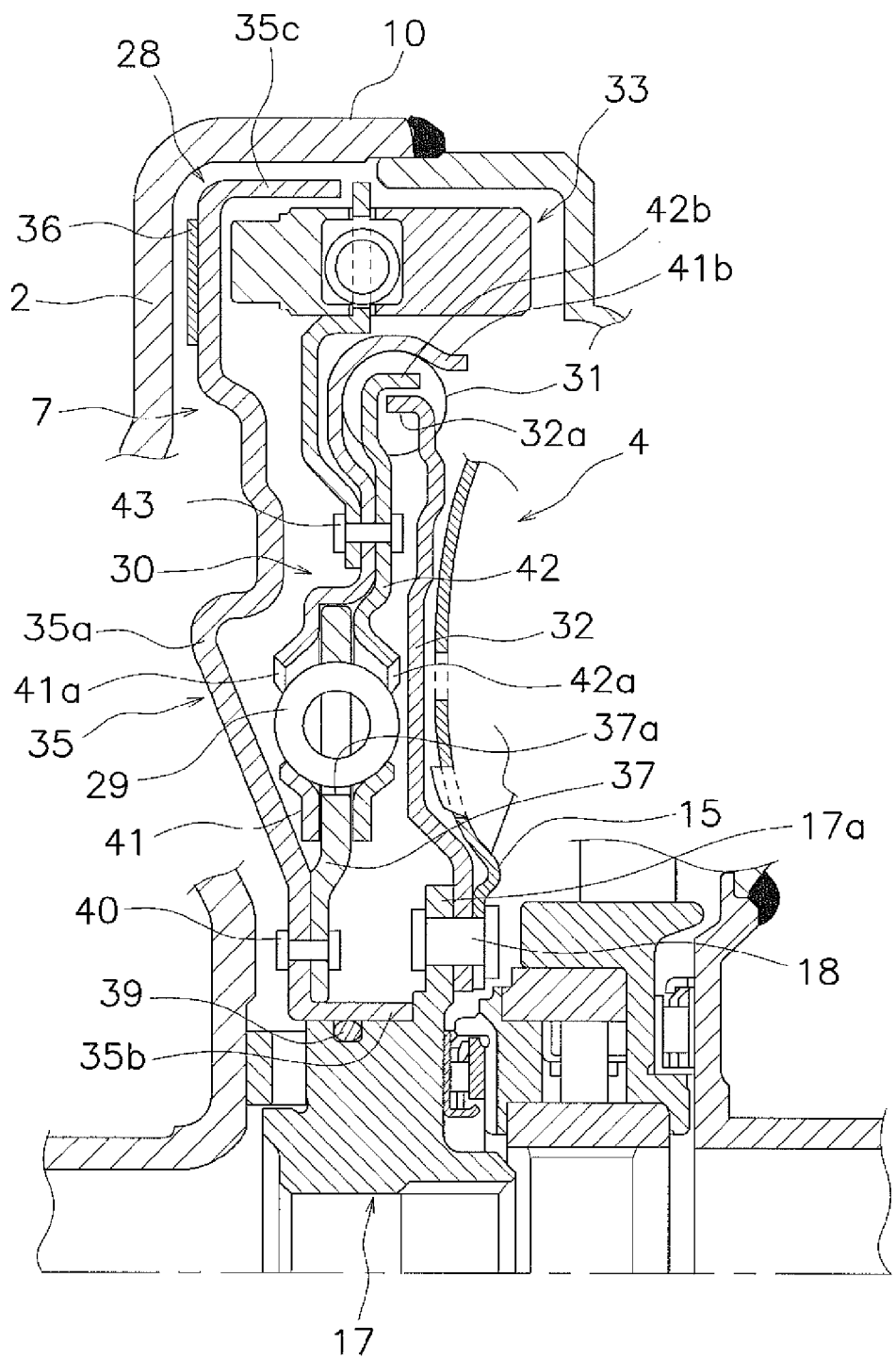
FIG. 2 is a diagram of the lock-up device extracted from FIG. 1.

FIG. 2 shows the lock-up device 7 extracted from FIG. 1. The lock-up device 7 is disposed in an annular space produced between the front cover 2 and the turbine 4. The lock-up device 7 includes a clutch portion 28, a plurality of inner peripheral side torsion springs 29, an intermediate member 30, a plurality of outer peripheral side torsion springs 31, a driven plate (an output rotary member) 32 and a dynamic damper device 33.

<Clutch Portion 26>

The clutch portion 28 is disposed in opposition to the front cover 2 so as to be axially movable, and a power from the front cover 2 is inputted thereto. The clutch portion 28 includes a piston 35, a friction member 36 and a drive plate 37.

The piston 35 has an annular shape and has a disc part 35a, an inner peripheral tubular part 35b and an outer peripheral tubular part 35c. The disc part 35a is disposed in opposition to the front cover 2. The inner peripheral tubular part 35b axially extends and is formed by bending the inner peripheral region of the disc part 35a toward the transmission. Additionally, the inner peripheral tubular part 35b is supported by the outer peripheral surface of the turbine hub 17 so as to be axially movable. The outer peripheral tubular part 35c axially extends and is formed by bending the outer peripheral region of the disc part 35a toward the transmission. The outer peripheral tubular part 35c is located on the inner peripheral side of the outer peripheral tubular part 10 of the front cover 2.

It should be noted that a seal member 39 is mounted onto the outer peripheral surface of the turbine hub 17, and thus, seals between the inner peripheral tubular part 35b of the piston 35 and the outer peripheral surface of the turbine hub 17.

The friction member 36 is fixed to the outer peripheral region of the disc part 35a of the piston 35 so as to be opposed to the front cover 2. When the piston 35 is axially moved and the friction member 36 is thereby pressed onto the front cover 2, a clutch-on state (a power transmitted state) is produced.

<Drive Plate 37 and Inner Peripheral Side Torsion Springs 29>

The drive plate 37 is a disc-shaped member, and the inner peripheral part thereof is fixed to that of the piston 35 by rivets 40. Additionally, the drive plate 37 has a plurality of window holes 37a bored in the outer peripheral part thereof. The plural window holes 37a respectively accommodate the plural inner peripheral side torsion springs 29.

<Intermediate Member 30 and Outer Peripheral Side Torsion Springs 31>

The intermediate member 30 is disposed between the piston 35 and the turbine 4, and is composed of a first plate 41 and a second plate 42, which are disposed such that the drive plate 37 is axially interposed therebetween. The first plate 41 and the second plate 42 are annular disc-shaped members, and are rotatable relatively to the drive plate 37 and the driven plate 32. The first plate 41 is disposed on the engine side, whereas the second plate 42 is disposed on the transmission side. The first and second plates 41 and 42 are coupled by a plurality of rivets 43 so as to be non-rotatable relatively to each other and be axially immovable.

Each of the first and second plates 41 and 42 has window holes 41a, 42a axially penetrating therethrough. Each window hole 41a, 42a has a circumferentially extending shape, and has cut-and-raised parts axially cut and raised on the inner and outer peripheral parts thereof. The inner peripheral side torsion springs 29 are accommodated in the window holes 41a and 42a and the window holes 37a of the drive plate 37, and are supported by the cut-and-raised parts of the window holes 41a and 42a of the both plates 41 and 42.

The first plate 41 has a spring support part 41b having a C-shaped cross section in the outer peripheral part thereof. The outer peripheral side torsion springs 31 are supported in the interior of the spring support part 41b. Put differently, the spring support part 41b is mounted so as to cover the radially outer peripheral parts and the axially engine-side parts of the outer peripheral side torsion springs 31.

Additionally, the second plate 42 has a plurality of locking parts 42b that are formed in the outer peripheral part thereof and are bent toward the transmission. The plural locking parts 42b are circumferentially disposed at predetermined intervals, and each outer peripheral side torsion spring 31 is disposed between two of the locking parts 42b.

The intermediate member 30 constructed as described above enables the inner peripheral side torsion springs 29 and the outer peripheral side torsion springs 31 to act in a series-like manner.

<Driven Plate 32>

The driven plate 32 is an annular disc-shaped member and the inner peripheral part thereof is fixed to the flange 17a of the turbine hub 17 together with the turbine shell 15 by the rivets 18. The driven plate 32 is disposed between the intermediate member 30 and the turbine 4. Additionally, the driven plate 32 has a plurality of engaging parts 32a as the outer peripheral part thereof, and the engaging parts 32a are engaged with the both ends of the respective outer peripheral side torsion springs 31. The plural engaging parts 32a are formed by bending the outer peripheral part of the driven plate 32 toward the engine.

<Input-Side Damper Mechanism and Output-Side Damper Mechanism>

In the construction as described above, an input-side damper mechanism Di is constructed by the drive plate 37, the pair of the first and second plates 41 and 42 axially interposing the drive plate 37 therebetween, and the plural inner peripheral side torsion springs 29 elastically coupling the drive plate 37 and the first and second plates 41 and 42 in the rotational direction. In such a construction, the drive plate 37 and the inner peripheral side torsion springs 29 are axially interposed between the first and second plates 41 and 42. The magnitude of hysteresis torque to be generated in this type of the input-side damper mechanism Di is relatively small.

On the other hand, an output-side damper mechanism Do is constructed by the outer peripheral parts of the first and second plates 41 and 42, the driven plate 32, and the plural outer peripheral side torsion springs 31 elastically coupling the second plate 42 and the driven plate 32 in the rotational direction. The magnitude of hysteresis torque to be generated in the output-side damper mechanism Do is larger than that of hysteresis torque to be generated in the input-side damper mechanism Di.

<Dynamic Damper Device 33>

Figure 3:
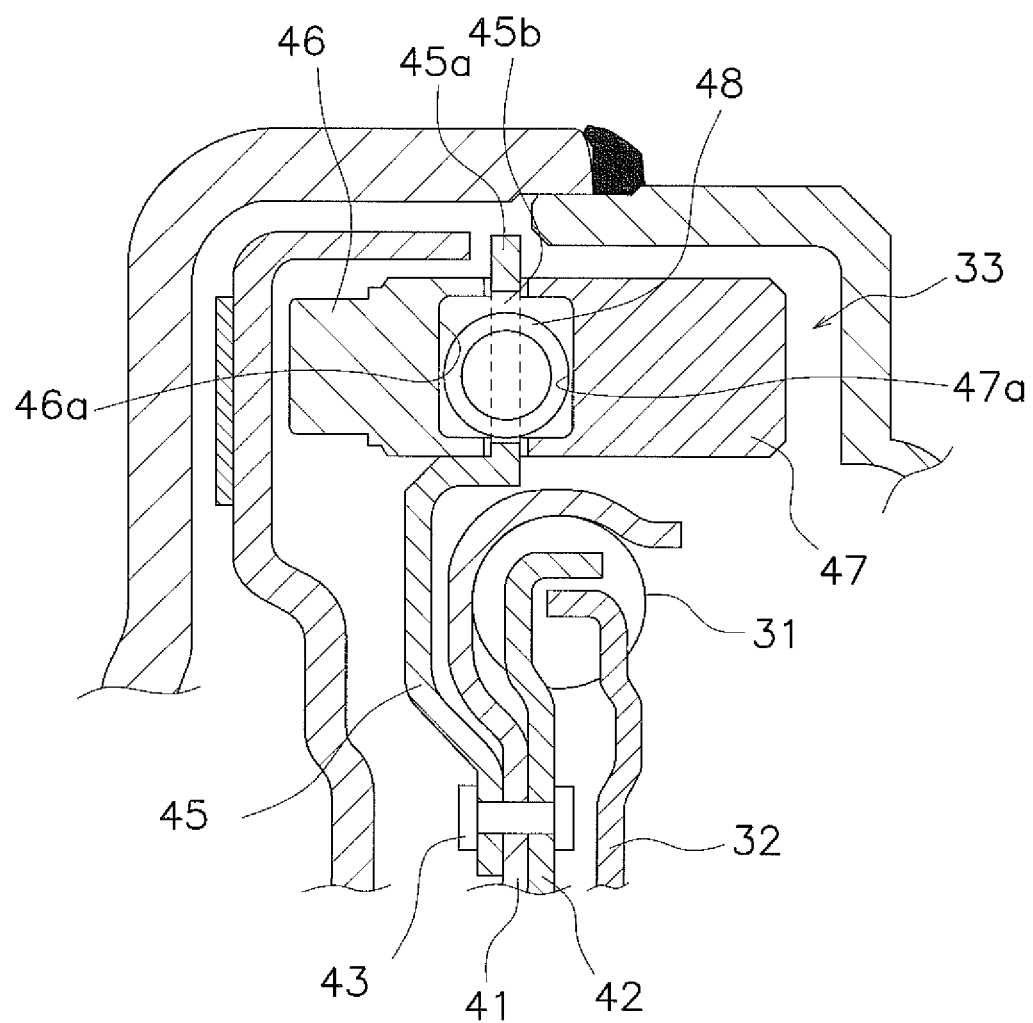
FIG. 3 is a diagram of a dynamic damper device extracted from FIG. 1.
Figure 4:
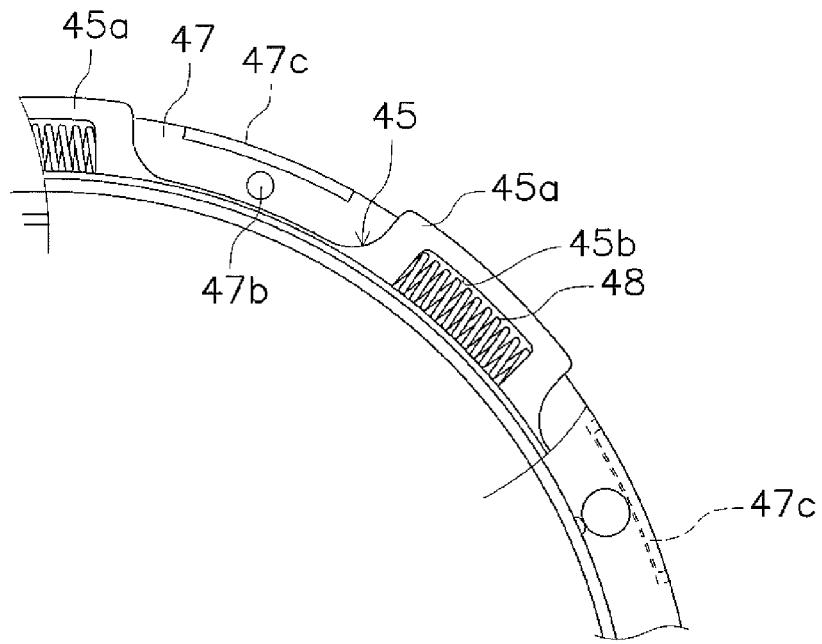
FIG. 4 is a partial front view of the dynamic damper device.

FIGS. 3 and 4 show the dynamic damper device 33 extracted from the entire construction. The dynamic damper device 33 includes a damper plate 45, first and second inertia rings 46 and 47, and a plurality of coil springs (dynamic damper elastic members) 48.

The damper plate 45 is a disc-shaped member, and the inner peripheral part thereof is fixed to the first and second plates 41 and 42 by the rivets 43. The damper plate 45 has a plurality of spring accommodating parts 45a that are circumferentially aligned at predetermined intervals. Each spring accommodating part 45a has an opening 45b bored with a predetermined circumferential length.

The first and second inertia rings 46 and 47 are disposed on the further outer peripheral side of the outer peripheral side torsion springs 31, and are also disposed such that the axial positions thereof overlap with those of the outer peripheral side torsion springs 31. Moreover, the first and second inertia rings 46 and 47 are disposed on the inner peripheral side of the outer peripheral tubular part 35c of the piston 35, and are disposed such that the radial positions thereof overlap with that of the friction member 36.

Figure 5:
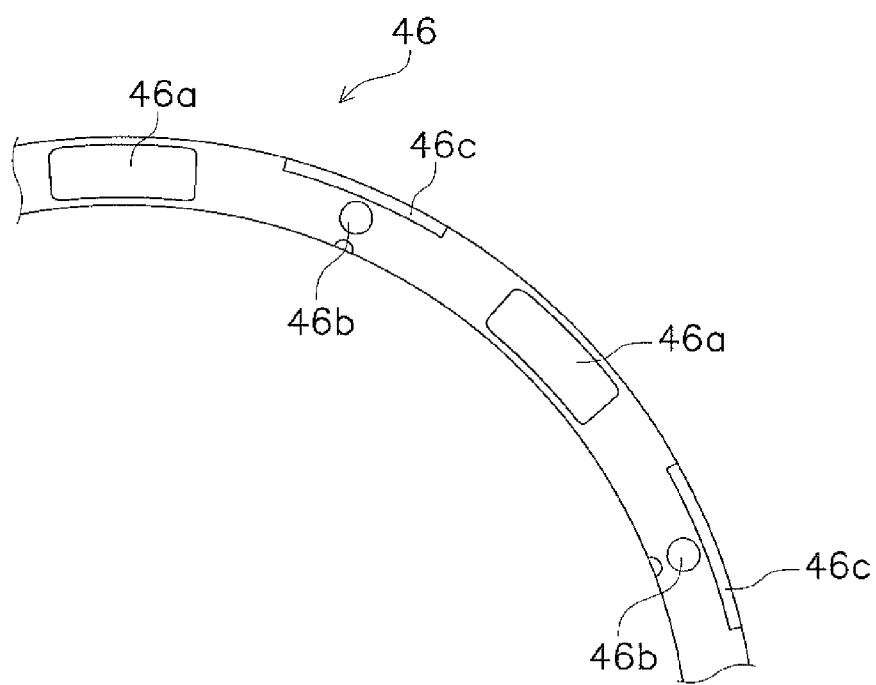
FIG. 5 is a partial front view of a first inertia ring composing a part of rice dynamic damper device.
Figure 6:
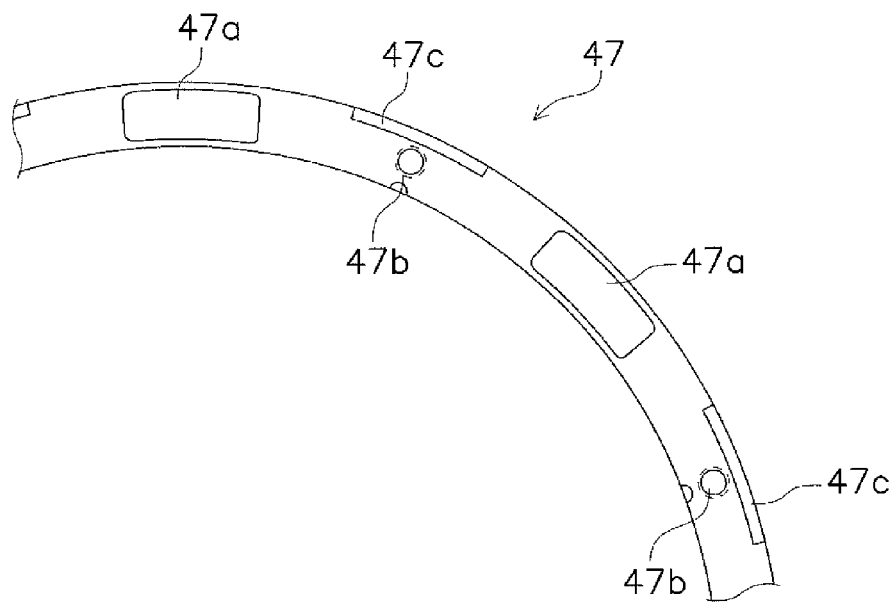
FIG. 6 is a partial front view of a second inertia ring composing a part of the dynamic damper device.

FIG. 5 partially shows the first inertia ring 46, whereas FIG. 6 partially shows the second inertia ring 47.

The first inertia ring 46 has a plurality of recesses 46a that are circumferentially aligned at predetermined intervals. The recesses 46a are formed so as to be recessed toward the engine. Additionally, the circumferential length of each recess 46a is equal to that of each opening 45b of the damper plate 45. An axially penetrating hole 46b and a spigot protrusion 46c are formed circumferentially between adjacent two of the recesses 46a. The holes 46b are the ones through which bolts (not shown in the drawings) for coupling the both inertia rings 46 and 47 penetrate. The spigot protrusions 46c are formed on the outer peripheral side of the holes 46b, and each has a predetermined length in the circumferential direction.

The second inertia ring 47 has a plurality of recesses 47a that are circumferentially formed at predetermined intervals. The recesses 47a are formed so as to be recessed toward the transmission in opposition to the first inertia ring 46. The circumferential length of each recess 47a is equal to that of each opening 45b of the damper plate 45. An axially extending screw hole 47b and a spigot recess 47c are formed circumferentially between adjacent two of the recesses 47a. The screw holes 47b are the ones into which the bolts (not shown in the drawings) for coupling the both inertia rings 46 and 47 are screwed. The spigot recesses 47c are formed on the outer peripheral side of the screw holes 47b, and each has a predetermined length in the circumferential direction. Additionally, the spigot protrusions 46c are engaged with the spigot recesses 47c.

In a condition that the spigot protrusions 46c of the first inertia ring 46 are engaged with the spigot recesses 47c of the second inertia ring 47, a predetermined axial gap is produced circumferentially between adjacent two of the pairs of the spigot protrusion 46c and the spigot recess 47c, i.e., in a predetermined angular range including a region in which the recesses 46a and 47a are formed. Each spring accommodating part 45a of the damper plate 45 is inserted into the gap. Additionally, each spring accommodating part 45a of the damper plate 45 is rotatable relatively to the both inertia rings 46 and 47 in the predetermined angular range while being inserted in the gap between the both inertia rings 46 and 48.

The plural coil springs 48 are respectively accommodated in accommodation spaces produced by the recesses 46a and 47a of the both inertia rings 46 and 47, and are also accommodated in the openings 45b of the spring accommodating parts 45a of the damper plate 45.

[Action]

First, an action of the torque converter body will be briefly explained. During rotation of the front cover 2 and the impeller 3, the operating oil flows from the impeller 3 to the turbine 4, and a torque is transmitted from the impeller 3 to the turbine 4 through the operating oil. The torque, transmitted to the turbine 4, is transmitted to the input shaft (not shown in the drawings) of the transmission through the turbine hub 17.

When the speed ratio of the torque converter 1 increases and the rotational speed of the input shaft reaches a predetermined speed, the operating oil residing between the front cover 2 and the piston 35 is drained whereas the operating oil is supplied to the turbine 4 side of the piston 35. Accordingly, the piston 35 is moved toward the front cover 2. As a result, the friction member 36 fixed to the outer peripheral part of the piston 35 is pressed onto the front cover 2, and the clutch portion 28 is turned into a clutch-on state.

In the clutch-on state as described above, the torque is transmitted through a path composed of the piston 35, de drive plate 37, the inner peripheral side torsion springs 29, the intermediate member 30, the outer peripheral side torsion springs 31 and the driven plate 32 in this order, and is then outputted to the turbine hub 17.

In the lock-up device 7, the torque is transmitted, and also, variation in torque inputted thereto from the front cover 2 is absorbed and attenuated. Specifically, when torsional vibration occurs in the lock-up device 7, the inner peripheral side torsion springs 29 and the outer peripheral side torsion springs 31 are compressed in series between the drive plate 37 and the driven plate 32. Due to this a torsion angle can be widened.

[Action of Dynamic Damper Device 33]

The torque transmitted to the intermediate member 30 is transmitted to the driven plate 32 through the outer peripheral side torsion springs 31, and is further transmitted to a transmission-side member through the turbine hub 17. At this time, the dynamic damper device 33 is mounted to the intermediate member 30. Hence, variation in rotation of the engine can be effectively inhibited. Put differently, the rotation of the damper plate 45 and that of the two inertia rings 46 and 47 are displaced in phase by the action of the coil springs 48. Specifically, the rotation of the inertia rings 46 and 47 is delayed comparably to that of the damper plate 45. Variation in rotation can be absorbed by the phase displacement.

Figure 7:
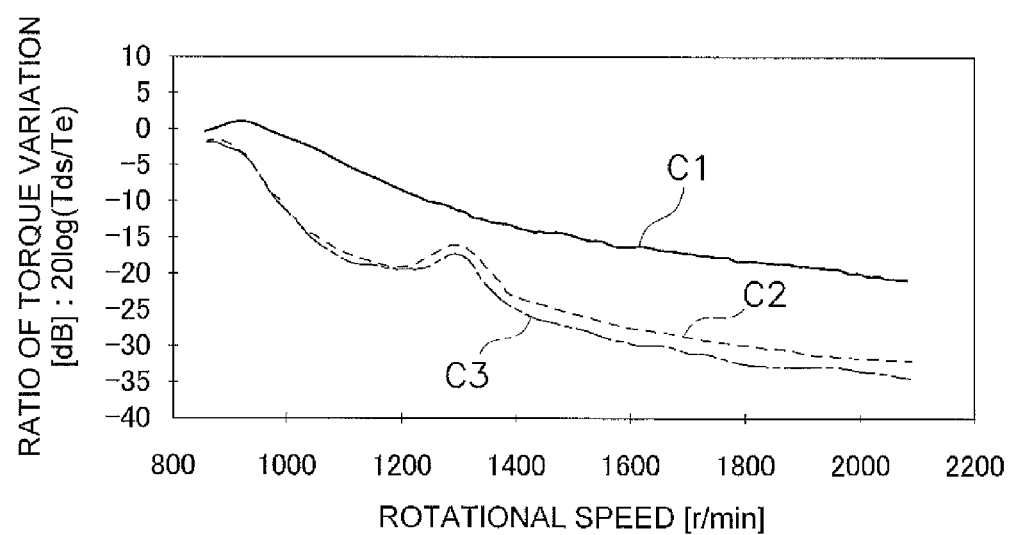
FIG. 7 is a characteristic diagram of engine rotational speed and variation in rotational speed.

Additionally, in the present exemplary embodiment, the dynamic damper device 33 is fixed to the intermediate member 30, and the outer peripheral side torsion springs 31 for inhibiting vibration are disposed between the dynamic damper device 33 and the turbine hub 17. As shown in FIG. 7, variation on in rotation can be more effectively inhibited by the action of the outer peripheral side torsion springs 31.

In FIG. 7, a characteristic C1 indicates variation in engine rotation. A characteristic C2 indicates variation in engine rotation to be caused when the dynamic damper device is mounted to the turbine hub and no elastic member (torsion spring) is mounted on the output side of the dynamic damper device. On the other hand, a characteristic C3 indicates variation in engine rotation to be caused when, as with the present exemplary embodiment, the dynamic damper device is mounted to the intermediate member and the elastic members (the outer peripheral side torsion springs 31) are mounted on the output side of the dynamic damper device. It should be noted that the characteristic C3 is the one obtained when, as with the present exemplary embodiment, the hysteresis torque in the output-side damper mechanism Do is larger than that in the input-side damper mechanism. Di. Suppose the magnitude of hysteresis torque to be generated by the input-side damper mechanism Di and that to be generated by the output-side damper mechanism Do are equal, a ratio of rotational speed variation (a ratio of torque variation) in middle to high rotational speed ranges becomes lower than that of the characteristic C2 but slightly higher than that of the characteristic C1.

As is obvious from comparison between the characteristics 12 and 13. In FIG. 7, when the torsion springs are mounted as the elastic members on the output side of the dynamic damper device, the peak of variation in rotation is lowered, and variation in rotation can be also inhibited even in a normal range of the engine rotational speed. Especially, when the hysteresis torque in the output-side damper mechanism Do is set to be larger than that in the input-side damper mechanism Di, bounces can be inhibited as much as possible in the ratio of rotational speed variation in the dynamic damper device. Especially, the ratio of rotational speed variation can be effectively inhibited in the middle to high rotational speed ranges.

[Features]

(1) The output-side damper mechanism Do, configured to generate a hysteresis torque larger than that in the input-side damper mechanism Di, is mounted on the output side of the dynamic damper device 33. Therefore, it is possible to especially enhance an effect of attenuating variation in rotational speed in the middle to high rotational speed ranges.

(2) It is not required to additionally provide a hysteresis torque generating mechanism. Hence, the entire device can be compactly formed with a small number of components.

(3) The input-side damper mechanism Di is disposed on the inner peripheral side of the output-side damper mechanism Do. Hence, the magnitude of hysteresis torque in the output-side damper mechanism Do can be easily greater than that of hysteresis torque in the input-side damper mechanism Di.

(4) The input-side damper mechanism Di is constructed such that the drive plate 37 and the inner peripheral side torsion springs 29 are interposed and held between one pair of the plates 41 and 42. Hence, the magnitude of hysteresis torque in the input-side damper mechanism Di can be reduced.

(5) Radial and axial movements of the outer peripheral side torsion springs 31 are restricted by the outer peripheral part of the first plate 41 composing apart of the intermediate member 30. Hence, the outer peripheral side torsion springs 31 can be supported in stable position with a simple construction.

(6) The first and second inertia rings 46 and 47 are disposed on the further outer peripheral side of the outer peripheral side torsion springs 31, and are located such that the axial positions thereof overlap with those of outer peripheral side torsion springs 31. Therefore, the axial space occupied by the inertia rings 46 and 47 can be reduced, and the axial space of the entire lockup device including de dynamic damper device 33 can be reduced.

(7) The first and second inertia rings 46 and 47 are disposed as much on the outer peripheral side as possible in the radial direction. Hence, an inertia moment by the both inertia rings 46 and 47 can be increased, and variation in rotational speed can be more effectively inhibited.

(8) The coil springs 48 are accommodated in the interior of the first and second inertia rings 46 and 47. Hence, the axial space occupied by the dynamic damper device can be further reduced. Additionally, it is possible to make the coil springs 48 exert a function of inertia, and the weight of the entire torque converter can be reduced.

(9) The inertia rings are axially split. Hence, the damper plate 45 can be easily inserted therein, and the coil springs 48 can be easily assembled thereto.

Other Exemplary Embodiments

The present invention is not limited to the exemplary embodiment as described above, and a variety of changes or modifications can be made without departing from the scope of the present invention.

(a) In the aforementioned exemplary embodiment, the outer peripheral side torsion springs 31 are designed to be supported by the outer peripheral part of the first plate 41. However, a member for supporting the outer peripheral side torsion springs 31 may be provided separately from the first plate 41.

(b) In the aforementioned exemplary embodiment, the elastic members are composed of the coil springs. However, another type of elastic members made of resin or so forth may be used instead.

INDUSTRIAL APPLICABILITY

The lock-up device for a torque converter according to the present invention can effectively attenuate variation in rotational speed over wide rotational speed ranges with a compact construction without increasing the number of components.

REFERENCE SIGNS LIST

1 Torque converter
2 Front cover
4 Turbine
6 Torque converter body
7 Lock-up device
28 Clutch portion
29 Inner peripheral side torsion spring
30 Intermediate member
31 Outer peripheral torsion spring
37 Drive plate
33 Dynamic damper device
36 Friction member
45 Damper plate
46 First inertia ring 46a Recess
47 Second inertia ring
47a Recess
48 Coil spring (Dynamic damper elastic member)
Di Input-side damper mechanism
Do Output-side damper mechanism

The invention claimed is:

1. A lock-up device for a torque converter, the lock-up device disposed between a front cover coupled to an engine-side member and a torque converter body, the lock-up device configured to directly transmit a torque from the front cover to a turbine of the torque converter, the lock-up device comprising:
   a clutch portion configured to transmit the torque from the front cover to an output side;
   an intermediate member disposed in a power transmission path between the clutch portion and the turbine;
   an input-side damper mechanism mounted between the clutch portion and the intermediate member, the input-side damper mechanism configured to attenuate variation in rotational speed;
   an output-side damper mechanism mounted between the intermediate member and the turbine, the output-side damper mechanism configured to generate a hysteresis torque larger than a hysteresis torque of the input-side damper mechanism and attenuate variation in rotational speed; and
   a dynamic damper device coupled to the intermediate member, the dynamic damper device configured to attenuate variation in rotational speed, the dynamic damper device including an inertia member, a damper plate, and a plurality of dynamic damper elastic members, the inertia member disposed on an outer peripheral side of the input-side damper mechanism and the output-side damper mechanism, the damper plate coupled to the intermediate member, the dynamic damper elastic members coupling the inertia member and the damper plate in a rotational direction.

2. The lock-up device recited in claim 1, wherein the input-side damper mechanism is disposed on an inner peripheral side of the output-side damper mechanism.

3. The lock-up device recited in claim 2, wherein the clutch portion includes
   a piston axially movable with respect to the front cover,
   a friction member mounted to an outer peripheral part of the piston and configured to be press-contacted to the front cover, and
   a drive plate fixed to the piston,
   the intermediate member includes a pair of plates, the plates rotatably mounted relative to the drive plate and axially interposing therein the drive plate, and
   the input-side damper mechanism includes
     the drive plate,
     the pair of plates, and
     a plurality of input-side elastic members elastically and rotation-directionally coupling the drive plate and the pair of plates.

4. The lock-up device recited in claim 2, wherein the output-side damper mechanism includes
   an outer peripheral part of the intermediate member,
   a driven plate coupled to the turbine,
   a plurality of output-side elastic members elastically and rotation-directionally coupling the intermediate member and the driven plate, and
   a support member restricting the plural output-side elastic members from radially moving and from axially moving to one side.

5. The lock-up device recited in claim 4, wherein the support member is formed by the outer peripheral part of the intermediate member.

6. The lock-up device recited in claim 4, wherein
   the inertia member is disposed on an outer peripheral side of the output-side elastic members, and
   the plurality of dynamic damper elastic members elastically and rotation-directionally couple the inertia member and the damper plate.

7. The lock-up device recited in claim 6, wherein
   the inertia member includes a first inertia ring and a second inertia ring, the first and second inertia rings axially split and having pairs of accommodation recesses axially opposed to each other, and
   the plural dynamic damper elastic members are accommodated in the pairs of accommodation recesses of the first and second inertia rings.

* * * * *